US012328367B2

(12) United States Patent
Zhao et al.

(10) Patent No.: US 12,328,367 B2
(45) Date of Patent: Jun. 10, 2025

(54) METHOD AND APPARATUS FOR ESTABLISHING SESSION, AND RELATED DEVICE

(71) Applicants: Beijing BOE Technology Development Co., Ltd., Beijing (CN); BOE Technology Group Co., Ltd., Beijing (CN)

(72) Inventors: Junjie Zhao, Beijing (CN); Liping Lei, Beijing (CN); Naifu Wu, Beijing (CN); Shuai Yang, Beijing (CN)

(73) Assignees: Beijing BOE Technology Development Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 188 days.

(21) Appl. No.: 17/423,908

(22) PCT Filed: Jan. 6, 2021

(86) PCT No.: PCT/CN2021/070497
§ 371 (c)(1),
(2) Date: Jul. 19, 2021

(87) PCT Pub. No.: WO2021/139690
PCT Pub. Date: Jul. 15, 2021

(65) Prior Publication Data
US 2022/0086239 A1    Mar. 17, 2022

(30) Foreign Application Priority Data
Jan. 9, 2020  (CN) .......................... 202010023494.0

(51) Int. Cl.
*H04L 67/141* (2022.01)
*H04L 65/1094* (2022.01)
(Continued)

(52) U.S. Cl.
CPC ........ *H04L 67/141* (2013.01); *H04L 65/1094* (2022.05); *H04L 67/145* (2013.01); *H04L 67/146* (2013.01)

(58) Field of Classification Search
CPC . H04L 67/146; H04L 67/141; H04L 65/1069; H04L 65/1094; H04L 67/61; H04L 67/12
(Continued)

(56) References Cited

U.S. PATENT DOCUMENTS

2009/0305733 A1    12/2009  Xu
2018/0092153 A1*    3/2018  Zhao ..................... H04W 76/10
(Continued)

FOREIGN PATENT DOCUMENTS

CN    101299785 A    11/2008
CN    101500045 A    8/2009
(Continued)

OTHER PUBLICATIONS

International Search Report for PCT/CN2021/070497 Mailed Mar. 30, 2021.
(Continued)

*Primary Examiner* — Nicholas P Celani
*Assistant Examiner* — Hien V Doan
(74) *Attorney, Agent, or Firm* — Ling Wu; Stephen Yang; Ling and Yang Intellectual Property (57) ABSTRACT

Provided are a method and apparatus for establishing a session, and a related device. The method applied to a session receiver includes: receiving a session request sent by a server, the session request including a session priority; displaying session information and determining whether a session acceptance operation is detected in a preset period of time; when the session acceptance operation is not detected in the preset period of time and the session priority is urgent, sending a user perception request to at least one terminal
(Continued)

device to acquire a target terminal device that perceives a user; and feeding back a first session response carrying an identifier of the target terminal device to the server, such that the server sends the session request to the target terminal device and establishes a session.

6 Claims, 7 Drawing Sheets

(51) Int. Cl.
  *H04L 67/145* (2022.01)
  *H04L 67/146* (2022.01)
(58) Field of Classification Search
  USPC .......................................................... 709/227
  See application file for complete search history.

(56) References Cited

U.S. PATENT DOCUMENTS

2019/0228766 A1   7/2019  White et al.
2020/0336327 A1*  10/2020  Shirasu ................... G06F 13/00

FOREIGN PATENT DOCUMENTS

| CN | 105959191 A | * | 9/2016 |
| CN | 110138937 A | | 8/2019 |
| CN | 110191241 A | | 8/2019 |
| CN | 110312049 A | | 10/2019 |

OTHER PUBLICATIONS

Office Action dated Nov. 24, 2021 for Chinese Patent Application No. 202010023494.0 and English Translation.

* cited by examiner

METHOD AND APPARATUS FOR ESTABLISHING SESSION, AND RELATED DEVICE

CROSS-REFERENCE TO RELATED APPLICATIONS

The present disclosure is a U.S. National Phase Entry of International Application No. PCT/CN2021/070497 having an international filing date of Jan. 6, 2021, which claims priority to Chinese patent application No. 202010023494.0 filed to CNIPA on Jan. 9, 2020, titled "Method and Apparatus for Establishing Session, and Related Device". The above-identified applications are hereby incorporated into this application by reference in their entirety.

TECHNICAL FIELD

The embodiments of the present disclosure relate to, but are not limited to the technical field of smart home, in particular to a method and apparatus for establishing a session, and a related device.

BACKGROUND

With the development of Internet of Things, the smart home field has become an important application field of Internet of Things. For example, the launch of smart photo frames and smart TVs facilitates the communication between users, enabling the users to have a session with smart photo frames and smart TVs via mobile terminals, and realizing sessions between smart photo frames and between a smart photo frame and a smart TV. With the increasing number and types of display devices, the number of devices with a session function is increasing. Therefore, taking smart home as an example, every room may be provided with devices that can perform a session.

Different from the conventional session between mobile terminals, the positions of smart home devices are usually fixed. For example, devices such as smart photo albums and smart TVs are usually fixed at certain positions and rarely moved. Therefore, when the users are not beside the smart home device, a session request cannot be accepted, so the fast delivery of urgent messages cannot be guaranteed and the user experience is poor.

SUMMARY

The following is a brief description of the subject matter described in detail in the present disclosure. This brief description is not intended to limit the scope of protection of the claims.

In a first aspect, an embodiment of the present disclosure provides a method for establishing a session, applied to a session receiver, including: receiving a session request sent by a server, the session request including a session priority; displaying session information and determining whether a session acceptance operation is detected in a preset period of time; when the session acceptance operation is not detected in the preset period of time and the session priority is urgent, sending a user perception request to at least one terminal device to acquire a target terminal device that perceives a user; and feeding back a first session response carrying an identifier of the target terminal device to the server to enable the server to send the session request to the target terminal device and to establish a session; or establishing a session with the target terminal device, and feeding back a second session response indicating session establishment to the server, to use the session receiver serves as a session forwarding device between the server and the target terminal device.

In a second aspect, an embodiment of the present disclosure provides a method for establishing a session, applied to a server, including: receiving a session request of a session initiator, the session request including an identifier of a session receiver; determining a session priority of the session request; sending the session request carrying the session priority to the session receiver; and when a first session response carrying an identifier of a target terminal device fed back by the session receiver is received, establishing a session with the target terminal device; or when a second session response indicating session establishment is received, using the session receiver as a session forwarding device between the server and the target terminal device.

In a third aspect, an embodiment of the present disclosure provides an apparatus for establishing a session, applied to a session receiver, including: a receiving module, configured to receive a session request sent by a server, the session request including a session priority; a display and determination module, configured to display session information and determine whether a session acceptance operation is detected in a preset period of time; a perception module, configured to, when the session acceptance operation is not detected in the preset period of time and the session priority is urgent, send a user perception request to at least one terminal device to acquire a target terminal device that perceives a user; and a feedback module, configured to feed back a first session response carrying an identifier of the target terminal device to the server to enable the server to send the session request to the target terminal device and to establish a session; or establish a session with the target terminal device, and feed back a second session response indicating session establishment to the server, to use the session receiver serves as a session forwarding device between the server and the target terminal device.

In a fourth aspect, an embodiment of the present disclosure provides an apparatus for establishing a session, applied to a server, including: a receiving module, configured to receive a session request of a session initiator, the session request including an identifier of a session receiver; a determination module, configured to determine a session priority of the session request; a sending module, configured to send the session request carrying the session priority to the session receiver; and a processing module, configured to, when a first session response carrying an identifier of a target terminal device fed back by the session receiver is received, establish a session with the target terminal device; or when a second session response indicating session establishment is received, use the session receiver as a session forwarding device between the server and the target terminal device.

In a fifth aspect, an embodiment of the present disclosure provides a terminal device, including: a processor and a memory storing a computer program executable on the processor, wherein the processor, when executing the program, implements the method for establishing a session according to the embodiment in the first aspect.

In a sixth aspect, an embodiment of the present disclosure provides a server, including: a processor and a memory storing a computer program executable on the processor, wherein the processor, when executing the program, implements the method for establishing a session according to the embodiment in the second aspect.

In a seventh aspect, an embodiment of the present disclosure provides a non-temporary computer-readable storage medium, when instructions in the storage medium are executed by a processor, the method for establishing a session according to the above embodiments is implemented.

In an eighth aspect, an embodiment of the present disclosure provides a computer program product, when instructions in the computer program product are executed by a processor, the method for establishing a session according to the above embodiments is implemented.

After reading and understanding the drawings and the detailed description, other aspects may be understood.

BRIEF DESCRIPTION OF DRAWINGS

The above and/or additional aspects and advantages of the embodiments of the present disclosure become easy to understand from the following description of the embodiments with reference to the following drawings.

DETAILED DESCRIPTION

The present disclosure is described in detail below, and examples of the embodiments are illustrated in the drawings, in which the same or similar reference signs always denote the same or similar components or components having the same or similar functions. The embodiments described below with reference to the drawings are exemplary, are only for the purpose of explaining the present disclosure, and should not be interpreted as limitations to the present disclosure.

Methods and apparatuses for establishing a session provided by the embodiments of the present disclosure are described below with reference to the drawings.

Figure 1:
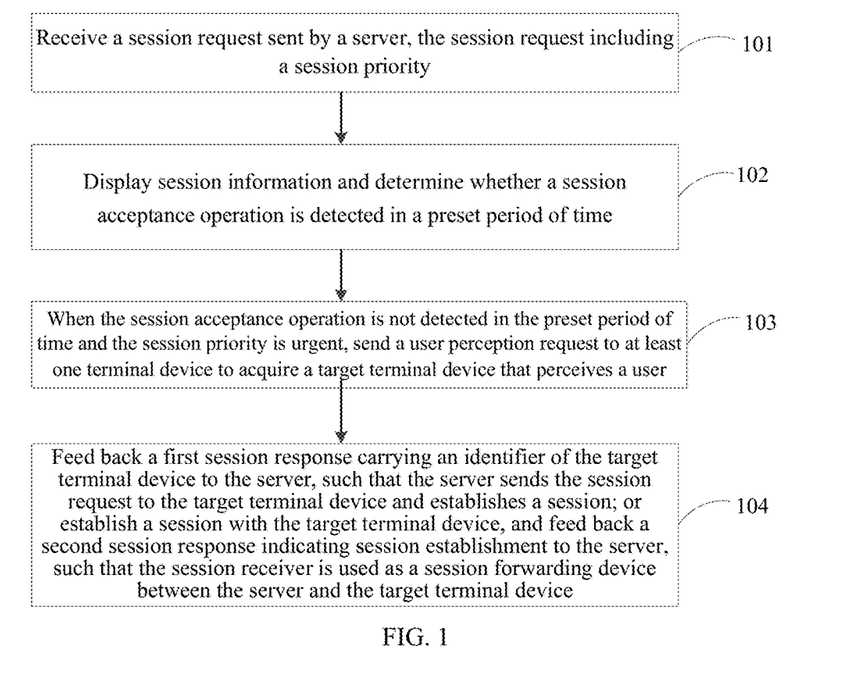
FIG. 1 is a flowchart of a method for establishing a session according to an exemplary embodiment of the present disclosure.

In a first aspect, an embodiment of the present disclosure provides a method for establishing a session, which is applied to a session receiver. FIG. 1 is a flowchart of the method for establishing a session provided by an embodiment of the present disclosure. The method for establishing a session is applied to the session receiver. That is to say, the method for establishing a session provided by the embodiment of the present disclosure is described from a side of the session receiver. In the embodiment of the present disclosure, the session receiver may be preset through a terminal device to designate the terminal device as a session receiver. For example, a smart photo album or a smart TV is configured as the session receiver.

Referring to FIG. 1, the method for establishing a session includes the following acts.

In act 101, a session request sent by a server is received, the session request including a session priority.

Taking a session initiator being a mobile terminal as an example, during establishment of a session between the mobile terminal and a smart home device, the mobile terminal may send a session request to the server, and then the server may send the session request of the mobile terminal to the session receiver.

In an exemplary embodiment, the session request may include but is not limited to the session priority. The session priority may include but is not limited to an urgent priority, a non-urgent priority, etc.

In an example, the server may determine the session priority by acquiring reference information. The reference information may include any one or more of the following parameters: a relationship between the session initiator and the session receiver, a content type of a session initiated by the session initiator, and whether session initiation time of the session initiator is working time of the session receiver. The session priority is determined on the basis of the reference information and a preset priority determination policy.

For example, Table 1 is shown as follows.

| | Relationship with the session receiver X | Content of the session initiated by the session initiator | Whether is the working time session of the receiver | Session priority |
|---|---|---|---|---|
| Session initiator A | Parent-child | — | — | I (urgent) |
| Session initiator B | Colleague | Work | — | I (urgent) |
| Session initiator C | Friend or colleague | Urgent event | — | I (urgent) |
| Session initiator D | Friend | Life | Yes | II (common) |
| Session initiator E | Colleague or friend | Life | No | III (lowest) |

The session initiator and session receiver may be bound with users in advance. If the relationship between the session initiator A and the session receiver X is a parent-child relationship, that is, a user corresponding to the session initiator A and a user corresponding to the session receiver X have a parent-child relationship, regardless of the content of the session initiated by the session initiator A and whether the session initiation time is the working time of the session receiver, the session priority may be set to the urgent priority.

In an exemplary embodiment, the session initiator A may leave a message when initiating a session, and the server determines the session content on the basis of the message. The working time of the session receiver may be set to, for example, 8:00 a.m. to 11:00 p.m., according to the situation of the user.

In an exemplary embodiment, if the relationship between the session initiator B and the session receiver X is a colleague relationship and the content of the session initiated by the session initiator is work, regardless of whether the session initiation time is the working time of the session receiver, the session priority may be set to the urgent priority.

In an exemplary embodiment, if the relationship between the session initiator C and the session receiver X is a colleague relationship and the content of the session initiated by the session initiator is an urgent event, regardless of whether the session initiation time is the working time of the session receiver, the session priority may be set to the urgent priority.

In an exemplary embodiment, if the relationship between the session initiator D and the session receiver X is a friend relationship, the content of the session initiated by the session initiator is life, and the session initiation time is the working time of the session receiver, the session priority may be set to the lowest priority.

In an exemplary embodiment, if the relationship between the session initiator E and the session receiver X is a friend relationship, the content of the session initiated by the session initiator is life, and the session initiation time is not the working time of the session receiver, the session priority may be set to the common priority.

In an exemplary embodiment, the session receiver may receive the session request of the session initiator sent by the server, and the session receiver and the server may establish a contact in advance. Optionally, the session receiver may send a registration request to the server before receiving the session request of the session initiator sent by the server, the server registers the session receiver and feeds back a registration success result to the session receiver, and the session receiver receives the registration success result fed back by the server.

In an exemplary embodiment, in order to enable the server to identify the session receiver according to the registration request, the registration request sent by the session receiver may include but is not limited to an identifier of the session receiver.

In an exemplary embodiment, any other terminal devices except the session receiver may send a registration request to the server for device registration, so as to facilitate subsequent session establishment between the server and the terminal device.

In an exemplary embodiment, the server may send relevant information of the terminal device to the session receiver to facilitate device discovery performed by the session receiver.

In an exemplary embodiment, the session request may include user feature information.

Taking the session initiator being a mobile terminal as an example, during establishment of a session between the mobile terminal and a smart home device, the mobile terminal may send a session request to the server, and then the server sends the session request of the mobile terminal to the session receiver. The user feature information may be used to uniquely identify a user, and may be, for example, any one or more of face feature information, profile feature information, gender information, fingerprint information, and iris information. The user feature information may be added to the session request, such that the terminal device can determine a user initiating the session according to the user feature information, thereby avoiding automatically considering the user initiating the session to be a user bound with the mobile terminal.

In an exemplary embodiment, the session request may include any one or more of the following pieces of information: the user feature information and session priority information. If the session request includes the user feature information and the session priority information, a multi-user scenario may be implemented and targeted fast connection may be implemented. If the session request includes the session priority information, fast connection may be implemented. If the session request includes the user feature information, target user determination in a multi-user scenario may be implemented.

In act 102, session information is displayed, and it is to determine whether a session acceptance operation is detected in a preset period of time.

In the embodiment of the present disclosure, after the session receiver receives the session request of the session initiator sent by the server, the session receiver may display the session information, such as the name of the session initiator and the relationship between the session initiator and the session receiver, according to parameter information, and determine whether the operation of the user accepting the session through the session receiver is detected in the preset period of time.

In act 103, when the session acceptance operation is not detected in the preset period of time and the session priority is urgent, a user perception request is sent to at least one terminal device to acquire a target terminal device that perceives a user.

In the embodiment of the present disclosure, when the session acceptance operation is not detected in the preset period of time and the session priority is urgent, the session receiver may send the user perception request to at least one terminal device. When receiving the user perception request, the terminal device may perform human body perception by means of a sensor thereof or perform human body perception by means of other sensors. If one of the terminal devices perceives a user, the terminal device may send a message indicating that the user is perceived to the session receiver, and the session receiver considers the terminal device to be the target terminal device. When a plurality of terminal devices perceive users at the same time, the session receiver may determine the target terminal device according to the distance between the terminal device and the user. For example, if a terminal device A and a terminal device B perceive the user at the same time, the terminal device A is 1 m far away from the user and the terminal device B is 1.5 m far away from the user, the terminal device A may be used as the target terminal device.

In an exemplary embodiment, when none of the at least one terminal device perceives a user, the at least one terminal device may send a user perception request to other nearby terminal devices that can perform communication, so as to perform user perception; and when one of other terminal devices perceives a user, the terminal device is used as the target terminal device, so as to establish a session between the service initiator and the target terminal device. A communication relationship, such as Bluetooth communication, may be established in advance between the terminal device sending the user perception request and the terminal device receiving the user perception request.

In the embodiment of the present disclosure, since the coverage of the terminal device is limited, the perception coverage can be increased via such the cascade perception mode, thereby improving the success rate of session establishment.

In an exemplary embodiment, when the session acceptance operation is not detected in the preset period of time and the session priority is non-urgent, a third session response indicating session establishment failure may be fed back to the server. If the session acceptance operation is detected in the preset period of time, it can be determined that the session is successfully established.

In act 104, a first session response carrying an identifier of the target terminal device is fed back to the server, such that the server sends the session request to the target terminal device and establishes a session; or a session with the target terminal device is established, and a second session response indicating session establishment is fed back to the server, such that the session receiver is used as a session forwarding device between the server and the target terminal device.

In an example, the session receiver may feed back the first session response carrying the identifier of the target terminal device to the server, and the server may determine the target terminal device according to the identifier of the target terminal device, send the session request to the terminal device, and establish the session.

Taking the session receiver being a photo album and the target terminal device being a refrigerator as an example, the photo album feeds back an identifier of the target terminal device (refrigerator) to the server, and the server determines that the target terminal device is the refrigerator according to the identifier, sends a session request to the refrigerator, and then establishes a session with the refrigerator.

In another example, the session receiver is used as the forwarding device between the server and the target terminal device. In other words, the session receiver may establish the session with the target terminal device and feed back the second session response indicating session establishment to the server. The server establishes the session with the target terminal device via the session receiver.

Taking the session receiver being a photo album and the target terminal device being a refrigerator as an example, the photo album is used as a forwarding device for a session between the server and the refrigerator, a session is established between the photo album and the refrigerator, and a session response indicating session establishment is fed back to the server, that is, the server establishes a session with the refrigerator via the photo album.

To sum up, by determining the session priority, the target terminal device that can perceive the user is acquired if the session priority is urgent, and the session with the urgent priority is sent to the target terminal device, so as to realize fast delivery of the session with the urgent priority. When the session is a non-urgent session, the device that can perceive the user is not actively acquired. In this way, different session requests can be processed differently by means of session priority distinction, thus improving the user experience and ensuring the fast delivery of urgent messages.

Figure 2:
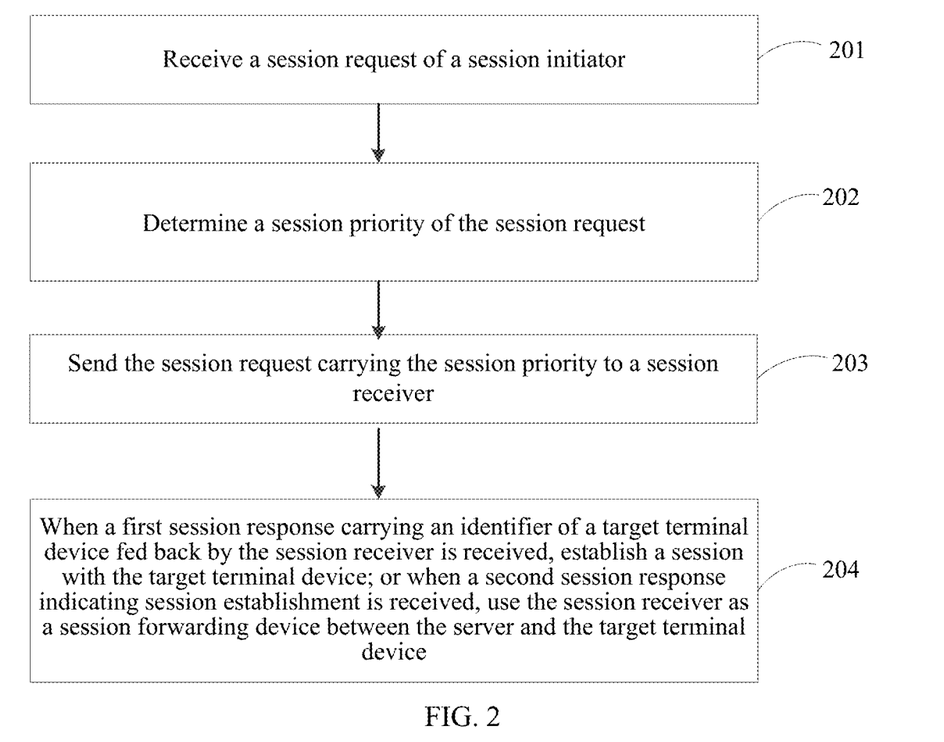
FIG. 2 is a flowchart of a method for establishing a session according to an exemplary embodiment of the present disclosure.

In a second aspect, an embodiment of the present disclosure provides a method for establishing a session, which is applied to a server. Referring to FIG. 2, an implementation process of the method for establishing a session includes the following acts.

In act 201, a session request of a session initiator is received.

Taking the session initiator being a mobile terminal, during establishment of a session between the mobile terminal and a smart home device, the mobile terminal may send a session request to the server, and the server receives the session request of the mobile terminal.

It can be understood that the server may receive the session request sent by the session initiator, send the session request to a session receiver, and the session receiver discovers a target terminal device so that a session is established between the target terminal device and the server. Optionally, before the session request of the session initiator is received, the method may include receiving a registration request sent by the terminal device. The registration request may include an identifier of the terminal device. When registration succeeds, a registration success result is fed back to the terminal device.

In an exemplary embodiment, the session receiver may receive the session request of the session initiator sent by the server, and the session receiver may establish a contact with the server in advance. In an example, the session receiver may send a registration request to the server for registration.

In act 202, a session priority of the session request is determined.

Optionally, reference information is acquired. The reference information may include any one or more of the following parameters: a relationship between the session initiator and the session receiver, a content type of a session initiated by the session initiator, and whether session initiation time of the session initiator is working time of the session receiver. The session priority is determined on the basis of the reference information and a preset priority determination policy.

For example, if the relationship between the session initiator A and the session receiver X is a parent-child relationship, that is, a user corresponding to the session initiator A and a user corresponding to the session receiver X have a parent-child relationship, regardless of the content of the session initiator by the session initiator A and whether the session initiation time is the working time of the session receiver, the session priority may be set to the urgent priority.

In an exemplary embodiment, the session initiator A may leave a message when initiating a session and the server determines the session content on the basis of the message. The working time of the session receiver may be set to, for example, 8:00 a.m. to 11:00 p.m., according to the situation of the user.

In an exemplary embodiment, if the relationship between the session initiator B and the session receiver X is a colleague relationship and the content of the session initiated by the session initiator is work, regardless of whether the session initiation time is the working time of the session receiver, the session priority may be set to the urgent priority.

In an exemplary embodiment, if the relationship between the session initiator C and the session receiver X is a colleague relationship and the content of the session initiated by the session initiator is an urgent event, regardless of whether the session initiation time is the working time of the session receiver, the session priority may be set to the urgent priority.

In an exemplary embodiment, if the relationship between the session initiator D and the session receiver X is a friend relationship, the content of the session initiated by the session initiator is life, and the session initiation time is the working time of the session receiver, the session priority may be set to the lowest priority.

In an exemplary embodiment, if the relationship between the session initiator E and the session receiver X is a friend relationship, the content of the session initiated by the session initiator is life, and the session initiation time is not the working time of the session receiver, the session priority may be set to a common priority.

In act 203, the session request carrying the session priority is sent to a session receiver.

In act 204, when a first session response carrying an identifier of a target terminal device fed back by the session receiver is received, a session with the target terminal device is established; or when a second session response indicating session establishment is received, the session receiver is used as a session forwarding device between the server and the target terminal device.

In the embodiment of the present disclosure, if the session acceptance operation of the session receiver is not detected in a preset period of time and the session priority is urgent, device discovery is performed, and the acquired identifier of the target terminal device that perceives the user is sent to the server. When receiving the first session response carrying the identifier of the target terminal device fed back by the session receiver, the server establishes a session with the target terminal device; alternatively, the session receiver serves as the session forwarding device between the server and the target terminal device, and when receiving the second session response indicating session establishment, the server performs the session with the target terminal device via the session receiver.

To sum up, by determining the session priority, the session with the target terminal device that perceives the user is established if the session priority is urgent, and the urgent session is sent to the target terminal device, so as to realize fast delivery of the urgent session. If the session is a non-urgent session, the session with the device that perceives the user is not actively established. In this way, different session requests can be processed differently by means of session priority distinction, thus improving the user experience and ensuring the fast delivery of urgent messages.

In order to more clearly describe the above embodiments, description is performed hereby using the following examples.

Figure 3:
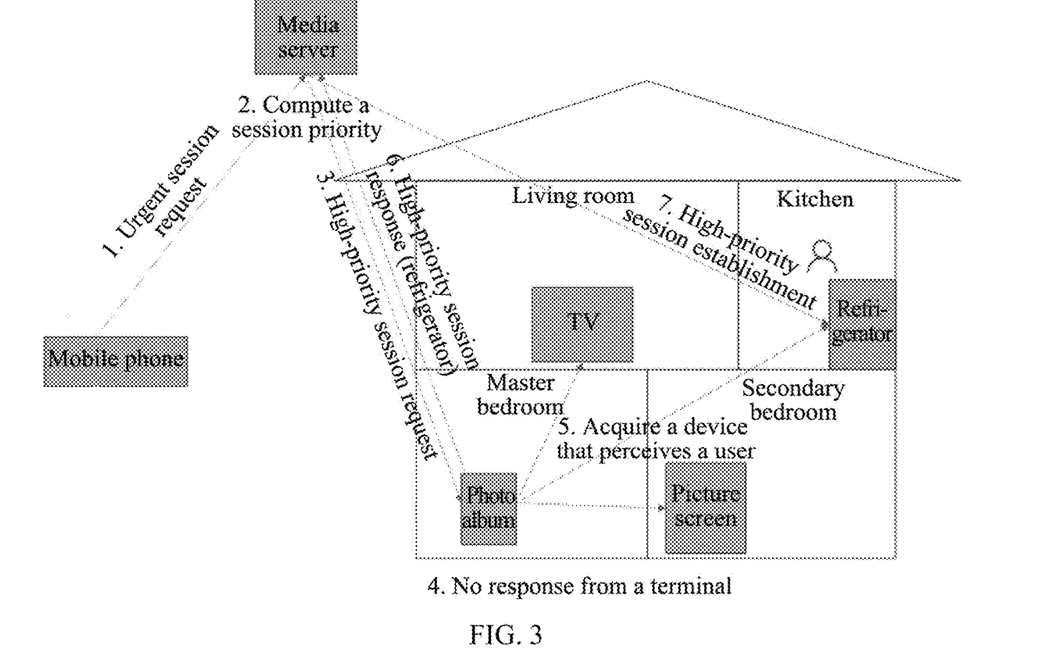
FIG. 3 is a schematic diagram of a method for establishing a session according to an exemplary embodiment of the present disclosure.
Figure 4:
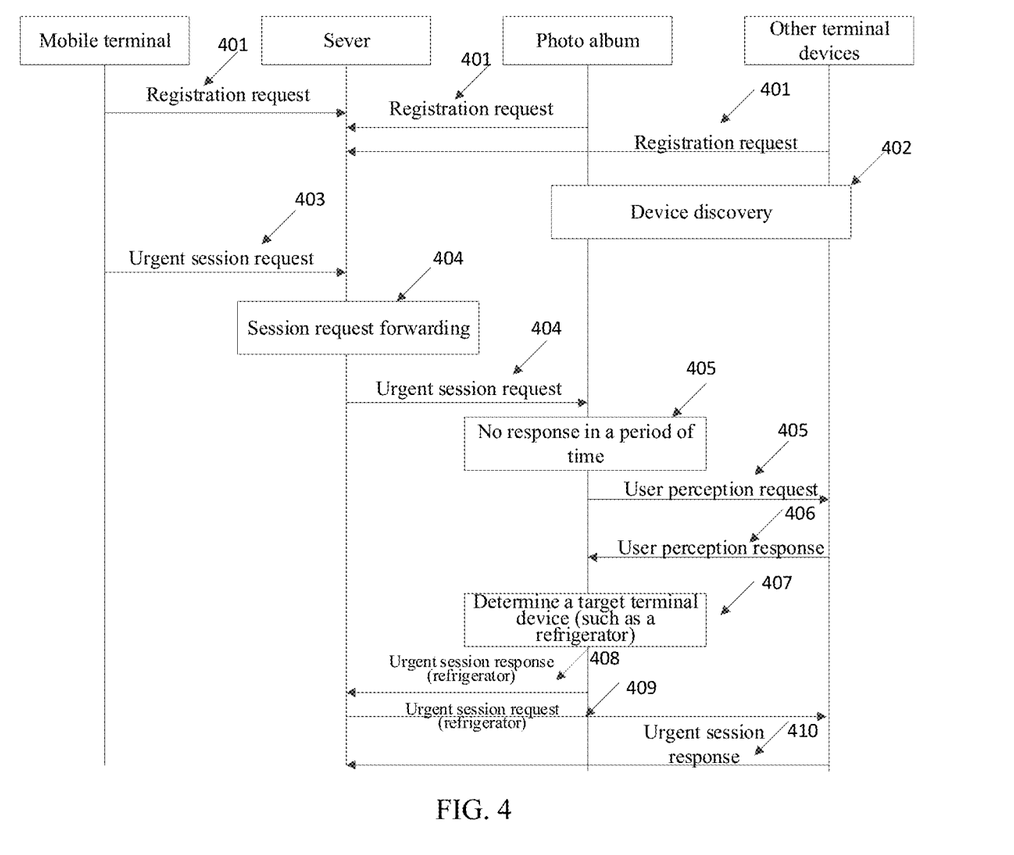
FIG. 4 is a signaling interaction diagram of a method for establishing a session according to an exemplary embodiment of the present disclosure.

A first example is as shown in FIG. 3, and FIG. 3 is a schematic diagram of a method for establishing a session according to an exemplary embodiment of the present disclosure. In FIG. 3, a case in which the session initiator is a mobile terminal, the session receiver is a photo album and the session priority is an urgent session is taken as an example. Corresponding to FIG. 3, FIG. 4 is a signaling interaction diagram of the method for establishing a session according to an exemplary embodiment of the present disclosure. Referring to FIG. 4, a signaling interaction implementation process of session establishment includes the following acts.

In act 401, a mobile terminal, a photo album, and other terminal devices except the photo album register to a server.

In act 402, the photo album performs local device discovery on the other terminal devices.

In act 403, the mobile terminal sends an urgent session request to the server, and the server performs computation to determine whether a session is an urgent session.

In act 404, after determining that the session is an urgent session, the server forwards the session request, and the photo album may receive the urgent session request sent by the server.

In act 405, if the photo album does not make a response in a period of time, the photo album sends a user perception request to the other terminal devices.

In act 406, the other terminal devices feed back user perception responses.

In act 407, the photo album determines a device that perceives a user, i.e., a target terminal device (for example, a refrigerator), according to the user perception responses.

In act 408, the photo album sends a session response carrying an identifier of the target terminal device to the server.

In act 409, the server sends an urgent session request to the target terminal device.

In act 410, the target terminal device feeds back an urgent session response.

Figure 5:
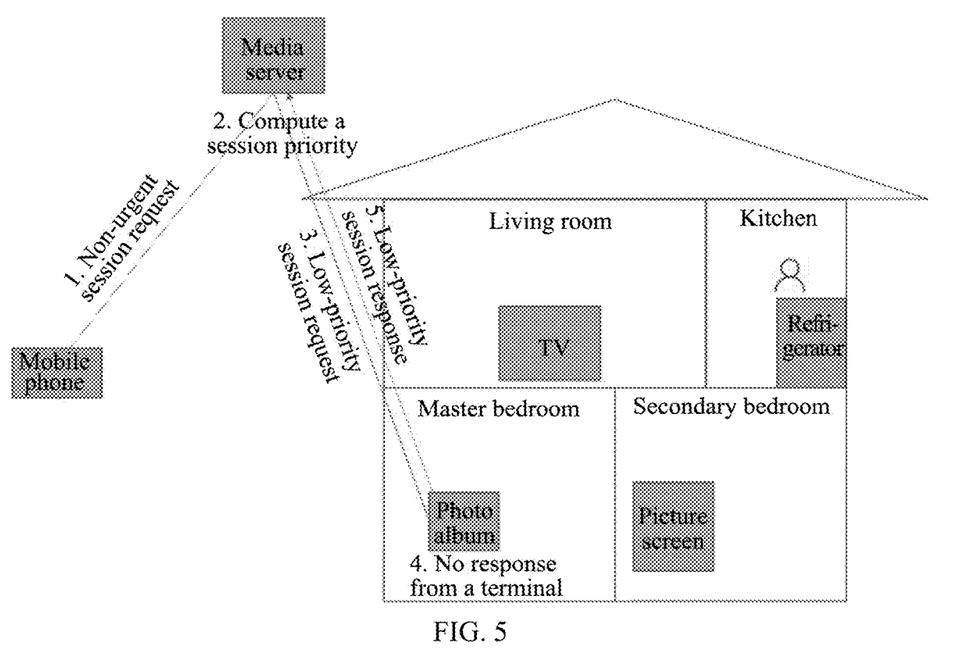
FIG. 5 is a schematic diagram of a method for establishing a session according to an exemplary embodiment of the present disclosure.
Figure 6:
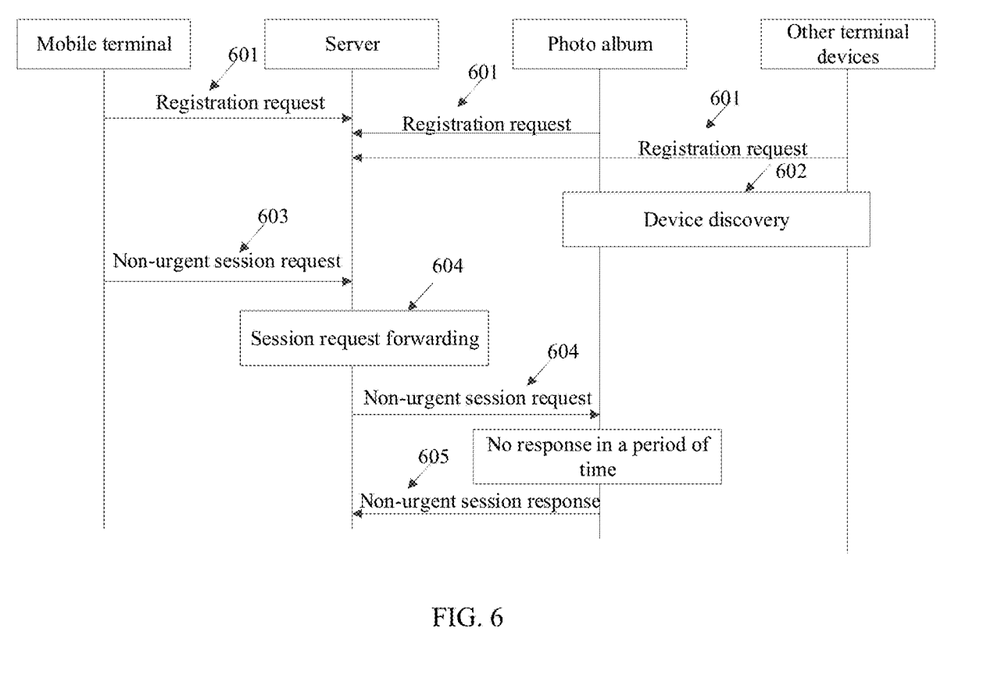
FIG. 6 is a signaling interaction diagram of a method for establishing a session according to an exemplary embodiment of the present disclosure.

A second example is as shown in FIG. 5, and FIG. 5 is a schematic diagram of a method for establishing a session according to an exemplary embodiment of the present disclosure. In FIG. 5, a case in which the session initiator is a mobile terminal, the session receiver is a photo album and the session priority is a non-urgent session is taken as an example. Corresponding to FIG. 5, FIG. 6 is a signaling interaction diagram of the method for establishing a session according to an exemplary embodiment of the present disclosure. Referring to FIG. 6, a signaling interaction implementation process of session establishment includes the following acts.

In act 601, a mobile terminal, a photo album, and other terminal devices except the photo album register to a server.

In act 602, the photo album performs local device discovery on the other terminal devices.

In act 603, the mobile terminal sends a non-urgent session request to the server, and the server performs computation to determine whether a session is an urgent session.

In act 604, after determining that the session is a non-urgent session, the server forwards the session request, and the photo album may receive the non-urgent session request sent by the server.

In act 605, if the photo album does not make a response in a period of time, the photo album sends a non-urgent session response to the server.

To sum up, by determining the session priority, a target terminal device that can perceive a user is acquired if the session priority is urgent, and the urgent priority session is sent to the target terminal device, so as to realize fast delivery of the urgent priority session. If the session is a non-urgent session, a device that can perceive the user is not actively acquired. In this way, different session requests can be processed differently by means of session priority distinction, thus improving the user experience and ensuring the fast delivery of urgent messages.

Figure 7:
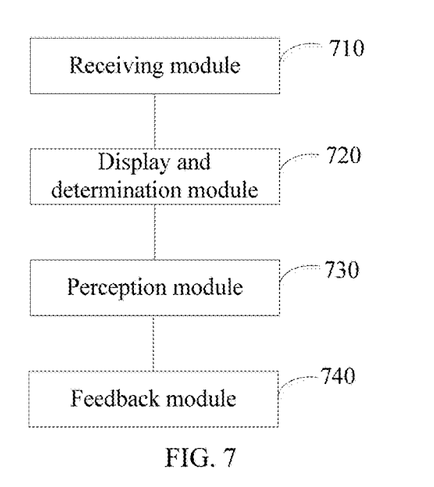
FIG. 7 is a schematic diagram of a structure of an apparatus for establishing a session according to an exemplary embodiment of the present disclosure.

Corresponding to the method for establishing a session provided by the embodiment illustrated in FIG. 1, an embodiment of the present disclosure further provides an apparatus for establishing a session, which is applied to a session receiver. Since the apparatus for establishing a session provided by the embodiment of the present disclosure corresponds to the method for establishing a session provided by the embodiment illustrated in FIG. 1, the implementation of the method for establishing a session is also applicable to the apparatus for establishing a session provided by this embodiment, which is described in detail in this embodiment. FIG. 7 is a schematic diagram of a structure of an apparatus for establishing a session provided by the embodiment of the present disclosure. Referring to FIG. 7, the apparatus for establishing a session includes: a receiving module 710, a display and determination module 720, a perception module 730, and a feedback module 740.

The receiving module 710 is configured to receive a session request sent by a server. The session request includes a session priority. The display and determination module 720 is configured to display session information and determine whether a session acceptance operation is detected in a preset period of time. The perception module 730 is configured to, when the session acceptance operation is not detected in the preset period of time and the session priority is urgent, send a user perception request to at least one terminal device to acquire a target terminal device that perceives a user. The feedback module 740 is configured to feed back a first session response carrying an identifier of the target terminal device to the server, such that the server sends the session request to the target terminal device and establishes a session; or establish a session with the target terminal device, and feed back a second session response indicating session establishment to the server, such that the session receiver is used as a session forwarding device between the server and the target terminal device.

The apparatus for establishing a session provided by the embodiment of the present disclosure is applied to the session receiver. The apparatus receives the session request sent by the server, the session request including the session priority; displays the session information and determines whether the session acceptance operation is detected in the preset period of time; when the session acceptance operation is not detected in the preset period of time and the session priority is urgent, sends the user perception request to the at least one terminal device to acquire the target terminal device that perceives the user; feeds back the first session response carrying the identifier of the target terminal device to the server, such that the server sends the session request to the target terminal device and establishes the session; or establishes the session with the target terminal device, and feeds back the second session response indicating session establishment to the server as the session forwarding device between the server and the target terminal device. The apparatus can implement the following: by determining the session priority, the target terminal device that can perceive the user is acquired if the session priority is urgent, and the urgent session is sent to the target terminal device, so as to realize fast delivery of the urgent session. If the session is a non-urgent session, a device that can perceive the user is not actively acquired. In this way, different session requests can be processed differently by means of session priority distinction, thus improving the user experience and ensuring the fast delivery of urgent messages.

Figure 8:
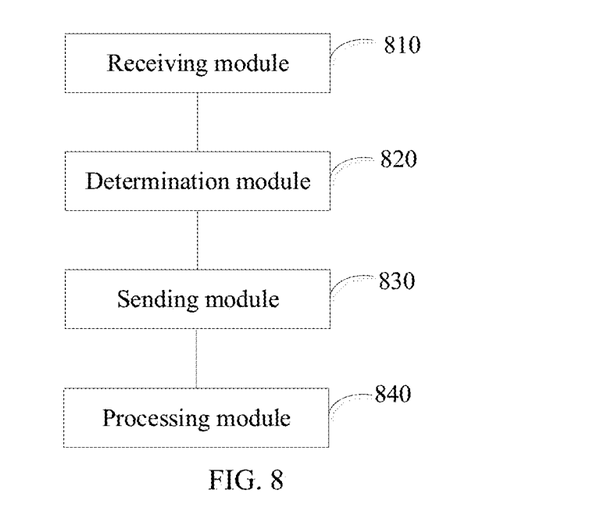
FIG. 8 is a schematic diagram of a structure of an apparatus for establishing a session according to an exemplary embodiment of the present disclosure.

Corresponding to the method for establishing a session provided by the embodiment illustrated in FIG. 2, an embodiment of the present disclosure further provides an apparatus for establishing a session, which is applied to a server. Since the apparatus for establishing a session provided by the embodiment of the present disclosure corresponds to the method for establishing a session provided by the embodiment illustrated in FIG. 2, the implementation of the method for establishing a session is also applicable to the apparatus for establishing a session provided by this embodiment, which is not described in detail in this embodiment. FIG. 8 is a schematic diagram of a structure of an apparatus for establishing a session provided by the embodiment of the present disclosure. Referring to FIG. 8, the apparatus for establishing a session includes: a receiving module 810, a determination module 820, a sending module 830, and a processing module 840.

The receiving module 810 is configured to receive a session request of a session initiator. The session request includes an identifier of a session receiver. The determination module 820 is configured to determine a session priority of the session request. The sending module 830 is configured to send the session request carrying the session priority to the session receiver. The processing module 840 is configured to, when a first session response carrying an identifier of a target terminal device fed back by the session receiver is received, establish a session with the target terminal device; or when a second session response indicating session establishment is received, use the session receiver as a session forwarding device between the server and the target terminal device.

The apparatus for establishing a session provided by the embodiment of the present disclosure is applied to a server. The apparatus receives the session request of the session initiator, the session request including an identifier of a session receiver; determines a session priority of the session request; sends the session request carrying the session priority to the session receiver; when the first session response carrying the identifier of the target terminal device fed back by the session receiver is received, establishes the session with the target terminal device; or when the second session response indicating session establishment is received, uses the session receiver as the session forwarding device between the server and the target terminal device. The apparatus can implement the following: by determining the session priority, the session with the target terminal device that perceives the user is established if the session priority is urgent, so as to realize fast delivery of the urgent session. If the session is a non-urgent session, the session with the target device that perceives the user is not actively established. In this way, different session requests can be processed differently by means of session priority distinction, thus improving the user experience and ensuring the fast delivery of urgent messages.

Figure 9:
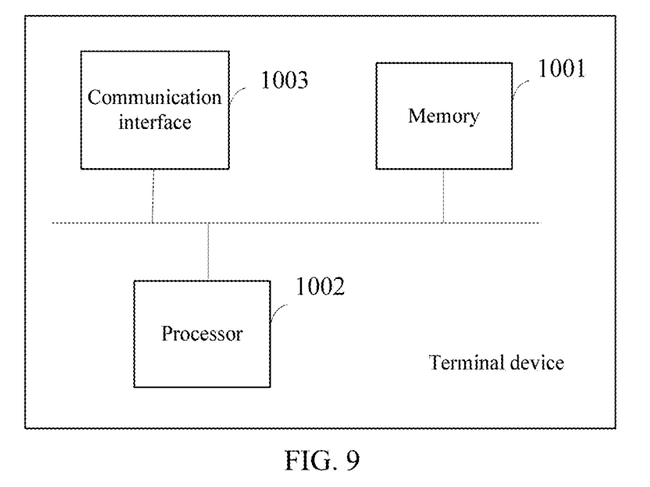
FIG. 9 is a schematic diagram of a structure of a terminal device according to an exemplary embodiment of the present disclosure.

In order to realize the embodiment illustrated in FIG. 1, an embodiment of the present disclosure provides a terminal device. FIG. 9 is a schematic diagram of a structure of a terminal device provided by an embodiment of the present disclosure. The terminal device may include a processor 1002 and a memory 1001 storing a computer program executable on the processor 1002. The processor 1002, when executing the program, implements the method for establishing a session provided by the embodiment illustrated in FIG. 1.

In an exemplary embodiment, the terminal device may include a communication interface 1003 configured for communication between the memory 1001 and the processor 1002. The memory 1001 is configured to store a computer program executable on the processor 1002. The memory 1001 may include a high-speed Random Access Memory (RAM) and/or a non-volatile memory, and for example, may include at least one disk memory. The processor 1002 is configured to, when executing the program, implement the method for establishing a session described in the embodiment illustrated in FIG. 1. If the memory 1001, the processor 1002, and the communication interface 1003 are implemented independently, the communication interface 1003, the memory 1001, and the processor 1002 may be connected to each other via a bus and complete the communication therebetween. The bus may be an Industry Standard Architecture (ISA) bus, a Peripheral Component (PCI) bus, or an Extended Industry Standard Architecture (EISA) bus, etc. The bus may be classified into an address bus, a data bus, and a control bus, etc. For the convenience of representation, only one thick line is used for representation in FIG. 9, but it does not mean that there is only one bus or one type of bus.

In an exemplary embodiment, if the memory 1001, the processor 1002, and the communication interface 1003 are integrated on one chip, the memory 1001, the processor 1002, and the communication interface 1003 may communicate with each other via an internal interface.

In an exemplary embodiment, the processor 1002 may be a Central Processing Unit (CPU), or an Application Specific Integrated Circuit (ASIC), or one or a plurality of integrated circuits configured to implement the embodiments of the present disclosure.

An embodiment of the present disclosure provides a server. The server includes a processor and a memory storing a computer program executable on the processor. The processor, when executing the program, implements the method for establishing a session according to the embodiment illustrated in FIG. 2.

An embodiment of the present disclosure provides a non-temporary computer-readable storage medium storing a computer program, and when the program is executed by a processor, the method for establishing a session according to any one of the above embodiments is implemented.

An embodiment of the present disclosure provides a computer program product. When instructions in the computer program product are executed by a processor, the method for establishing a session according to any one of the above embodiments is implemented.

In this description, the description with reference to the terms "an embodiment", "some embodiments", "examples", "exemplary embodiment", or "some examples" means that the features, structures, materials, or characteristics described in conjunction with the embodiment or example are included in at least one embodiment or example of the present disclosure. In this description, the schematic expression of the above terms does not necessarily refer to the same embodiment or example. Moreover, the described features, structures, materials, or characteristics may be combined in an appropriate manner in any one or more of embodiments or examples. In addition, without contradiction, those skilled in the art may combine different embodiments or examples described in this description and the features of different embodiments or examples.

In addition, the terms "first" and "second" are used for descriptive purposes only and cannot be interpreted as indicating or implying relative importance or implicitly indicating the number of technical features indicated. Thus, the features defined by "first" and "second" may explicitly or implicitly include at least one of the features. In the description of the present disclosure, "a plurality of" refers to "at least two", such as "two" or "three", unless otherwise explicitly defined.

Any process or method description in the flowchart or otherwise described herein can be interpreted as representing a module, fragment, or portion of a code that includes one or more executable instructions for implementing the acts of a custom logical function or process, and the scope of the embodiments of the present disclosure includes additional implementations, which may not be shown or discussed in the order, including executing functions in a substantially simultaneous manner or in a reverse order according to the functions involved, which should be understood by those skilled in the art to which the embodiments of the present disclosure belong.

The logics and/or acts represented in the flowchart or otherwise described herein, for example, may be considered to be an ordered list of executable instructions for implementing logical functions, and may be implemented in any computer-readable medium for use by instruction execution systems, apparatuses, or devices (such as computer-based systems, systems including processors, or other systems that can read and execute instructions from instruction execution systems, apparatuses, or devices), or for use in combination with such instruction execution systems, apparatuses, or devices. In this description, "computer-readable medium" may be any device that may contain, store, communicate, propagate, or send a program for use by or in combination with instruction execution systems, apparatuses, or devices. Examples (non-exhaustive listed) of the computer-readable medium include an electrical connector (electronic device) with one or a plurality of pieces of wiring, a portable computer cartridge (magnetic device), a Random Access Memory (RAM), a Read-Only Memory (ROM), an erasable programmable read-only memory (such as Electrical Programmable Read Only Memory (EPROM) or flash memory), an optical fiber apparatus, and a Compact Disc Read-Only Memory (CDROM). In addition, the computer-readable medium may even be paper or other suitable media on which the program can be printed, because the program can be acquired electronically, for example, by optically scanning the paper or other media, followed by editing, interpreting, or other suitable processing if necessary, and then stored in a computer memory.

It should be understood that all parts of the present disclosure may be implemented in hardware, software, firmware, or a combination thereof. In the above embodiments, a plurality of acts or methods may be implemented with software or firmware stored in a memory and executed by a suitable instruction execution system. For example, if it is implemented by hardware, as in another embodiment, it may be implemented by any one or a combination of the following technologies well known in the art: a discrete logic circuit with a logic gate circuit for implementing a logic function of data signals, an application specific integrated circuit with an appropriate combined logic gate circuit, a Programmable Gate Array (PGA), a Field Programmable Gate Array (FPGA), etc.

Those skilled in the art can understand that all or part of the acts of the methods in the above embodiments can be implemented by instructing the relevant hardware via a program. The program may be stored in a computer-readable storage medium. The program, when executed, includes one or a combination of the acts in the method embodiments.

In addition, each functional unit in each embodiment of the present disclosure may be integrated into a processing module, each unit may exist separately and physically, or two or more than two units may be integrated into one module. The above integrated module may be implemented in the form of hardware or software function modules. The integrated module may also be stored in a computer-readable storage medium if implemented in the form of a software function module and sold or used as an independent product.

The storage medium mentioned above may be a read-only memory, a disk, or an optical disk. Although the embodiments of the present disclosure are shown and described above, it can be understood that the above embodiments are exemplary and cannot be interpreted as limitations to the present disclosure. Those skilled in the art may change, modify, replace, and vary the above embodiments within the scope of the present disclosure.

What is claimed is:

1. An apparatus for establishing a session, applied to a session receiver, comprising a processor and a communication interface:

wherein the processor is configured to control the communication interface to receive a session request sent by a server, wherein the session request sent by the server comprises a session priority that is determined by the server based on reference information and a preset priority determination policy;

wherein the processor is further configured to display session information and determine whether a session acceptance operation is detected in a preset period of time; to control the communication interface to, when the session acceptance operation is not detected in the preset period of time and the session priority is urgent, send a user perception request directly to at least one terminal device that has direct communication connection with the session receiver, and take a terminal device that perceives a user as a target terminal device; and the processor is further configured to control the communication interface to feedback, in response to the session request sent by the server, a first session response carrying an identifier of the target terminal device to the server, wherein based on the first session response, the server sends the session request to the target terminal device and to establish a session with the target terminal device;

wherein the reference information based on which the session priority is determined by the server comprises one or more of the following parameters: a relationship between a session initiator and the session receiver, a content type of a session initiated by the session initiator, and whether session initiation time of the session initiator is working time of the session receiver.

2. A terminal device, comprising the apparatus for establishing a session according to claim 1.

3. A non-transitory computer-readable storage medium storing a computer program, wherein a processor, when executing the program, performs the operations of the processor in claim 1.

4. The apparatus according to claim 1, wherein the processor is configured to control the communication interface to:

when the session acceptance operation is not detected in the preset period of time and the session priority is non-urgent, feedback a third session response indicating session establishment failure to the server.

5. The apparatus according to claim 1, wherein the processor is further configured to:

when the session acceptance operation is detected in the preset period of time, determine that the session is established successfully.

6. The apparatus according to claim 1, wherein the processor is configured to control the communication interface to:

before receiving the session request of a session initiator sent by the server, send a registration request to the server, the registration request comprising an identifier of the session receiver; and receive a registration success result fed back by the server.

* * * * *